(12) United States Patent
Gorzynski et al.

(10) Patent No.: US 8,103,157 B2
(45) Date of Patent: *Jan. 24, 2012

(54) CAMERA ADJUSTMENT

(75) Inventors: Mark E Gorzynski, Corvallis, OR (US); Scott Grasley, Corvallis, OR (US); David R Ingalls, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/837,966

(22) Filed: Jul. 16, 2010

(65) Prior Publication Data

US 2010/0278522 A1    Nov. 4, 2010

Related U.S. Application Data

(63) Continuation of application No. 11/497,177, filed on Aug. 1, 2006.

(51) Int. Cl.
*G03B 17/00* (2006.01)
*H04N 7/14* (2006.01)
(52) U.S. Cl. ........................ 396/79; 348/14.07
(58) Field of Classification Search .................. 396/79; 348/14.07, E7.083
See application file for complete search history.

(56) References Cited

U.S. PATENT DOCUMENTS

2007/0263080 A1* 11/2007 Harrell et al. .............. 348/14.08
* cited by examiner

*Primary Examiner* — Clayton E Laballe
*Assistant Examiner* — Noam Reisner

(57) ABSTRACT

Cameras are adjusted by setting magnifications of two or more cameras to be substantially equal, focusing the two or more cameras, and setting the two or more cameras so that portions of an object captured thereby when displayed are aligned.

17 Claims, 9 Drawing Sheets

CAMERA ADJUSTMENT

CROSS REFERENCE TO RELATED APPLICATION

This application is a continuation of and claims priority from U.S. patent application Ser. No. 11/497,177, filed Aug. 1, 2006, and entitled, "Camera Adjustment," which is incorporated herein by reference in its entirety.

BACKGROUND

During videoconferencing, cameras are often used for transmitting images from one conference facility to one or more displays at one or more remote conference facilities. Large conference facilities with multiple participants may require multiple cameras and displays to capture all of the participants. When the images from these cameras are shown together, the separation between displays can create geometric distortions that might make the images distracting. Some conference facilities use multiple cameras, but do not have an accurate arrangement to correct for distortions. A single camera may be used for wide shots to prevent distortion, but this may result in unsatisfactory eye contact at sides the displays.

DETAILED DESCRIPTION

In the following detailed description of the present embodiments, reference is made to the accompanying drawings that form a part hereof, and in which are shown by way of illustration specific embodiments that may be practiced. These embodiments are described in sufficient detail to enable those skilled in the art to practice disclosed subject matter, and it is to be understood that other embodiments may be utilized and that process, changes may be made without departing from the scope of the claimed subject matter. The following detailed description is, therefore, not to be taken in a limiting sense, and the scope of the claimed subject matter is defined only by the appended claims and equivalents thereof.

Figure 1:
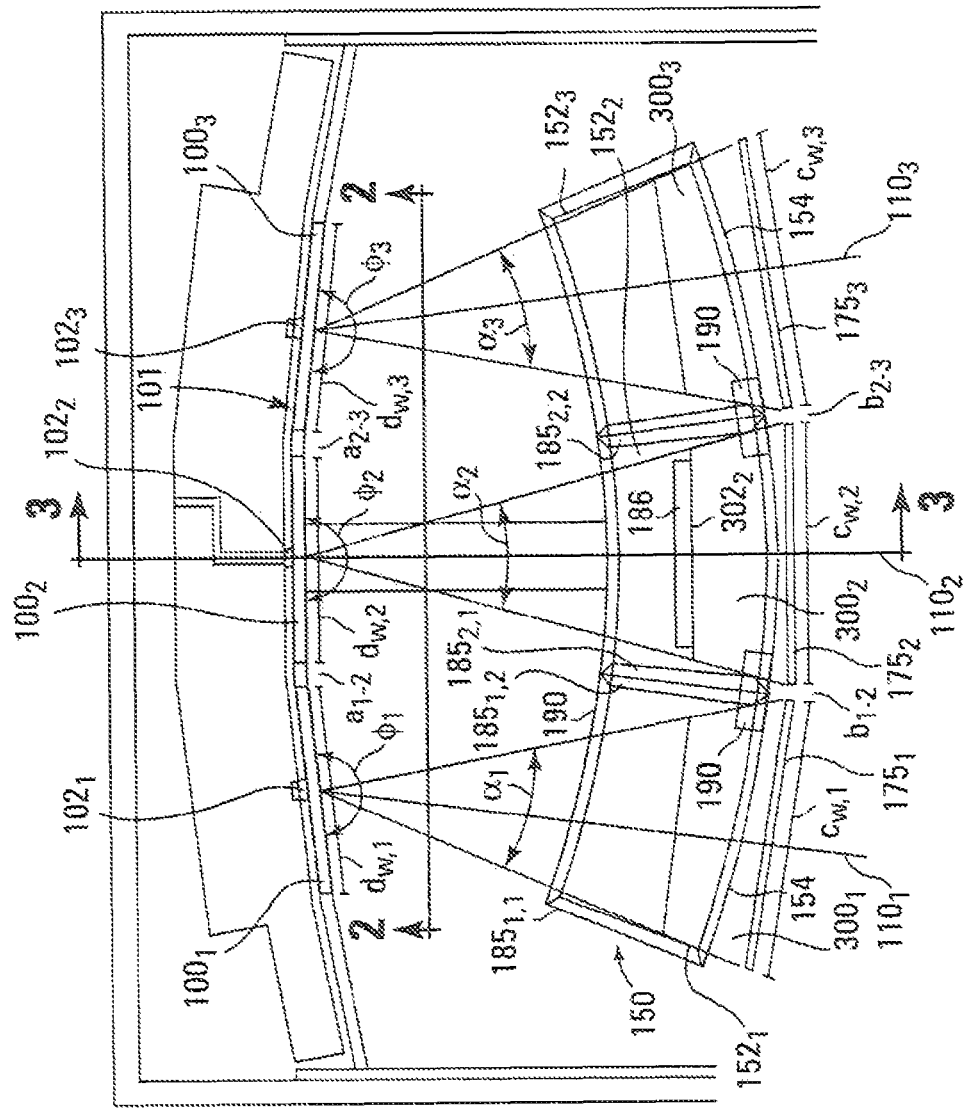
FIG. 1 is a plan view illustrating an embodiment of a camera and a display setup, according to an embodiment of the invention.
Figure 2:
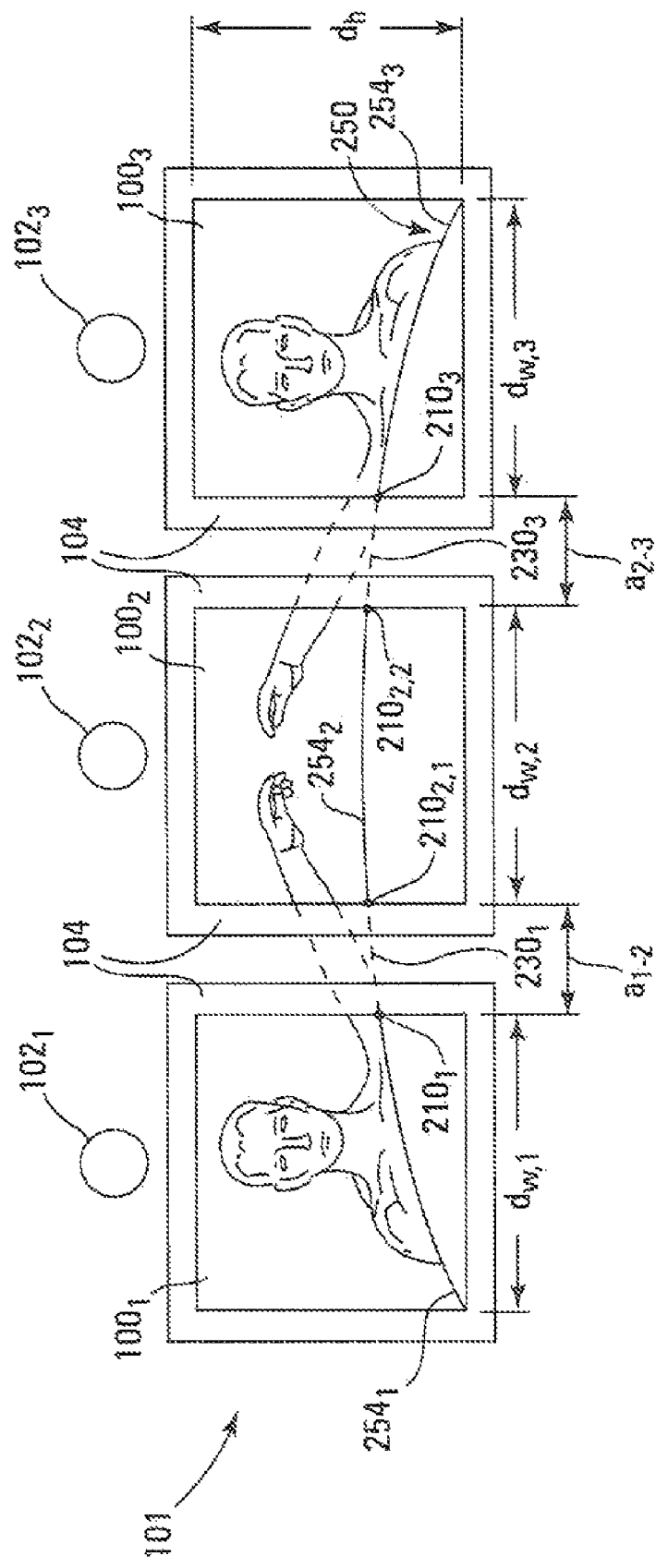
FIG. 2 is a view taken along line 2-2 of FIG. 1, according to another embodiment of the invention.
Figure 3:
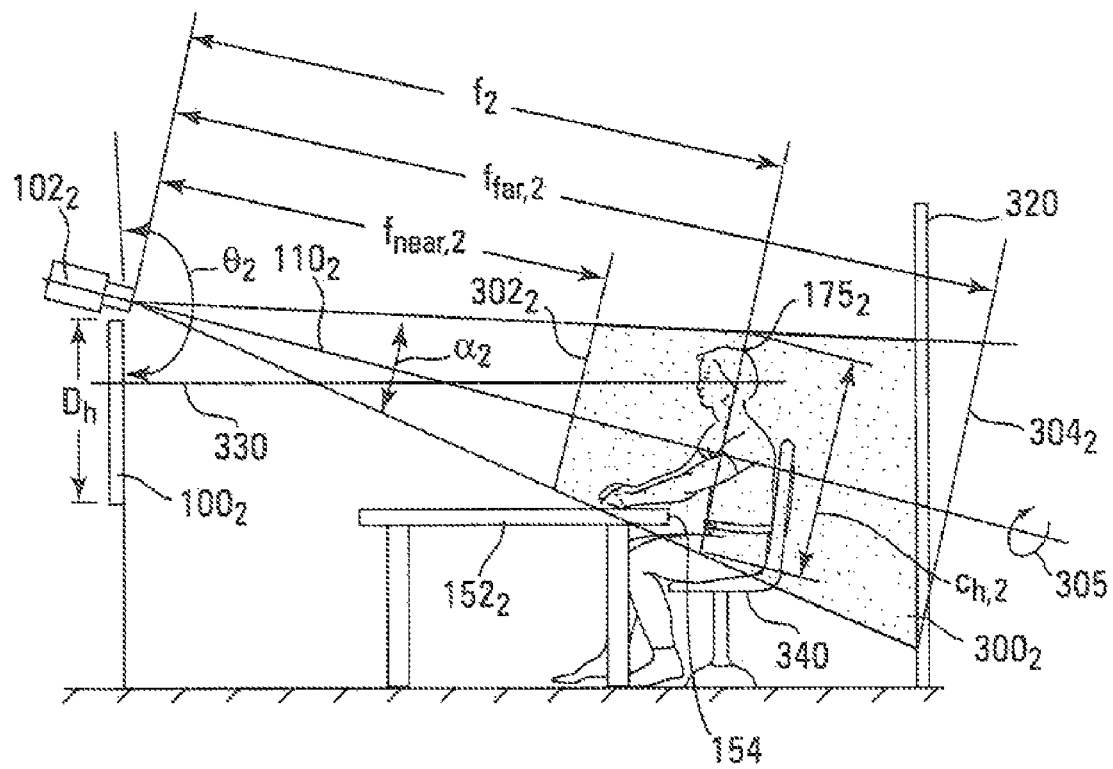
FIG. 3 is a view taken along line 3-3 of FIG. 1, according to another embodiment of the invention.

FIG. 1 is a plan view illustrating a camera and a display setup disposed in a room, such as a videoconferencing room, according to an embodiment. FIG. 2 is a view taken along line 2-2 of FIG. 1, according to another embodiment. FIG. 3 is a view taken along line 3-3 of FIG. 1, according to another embodiment. For one embodiment, a segmented display 101, e.g., located on a wall of the room, includes display segments 100. For another embodiment, cameras $102_1$ to $102_3$ are respectively positioned above display segments $100_1$ to $100_3$, as shown in FIG. 2. For some embodiments, display segments 100 form angles to each other, as shown in FIG. 1. For other embodiments, display segments 100 are substantially coplanar or are coplanar.

Display segments $100_1$, $100_2$, $100_3$ respectively have display widths of $d_{w,1}$, $d_{w,2}$, and $d_{w,3}$. A distance $a_{1-2}$ separates display $100_1$ from display $100_2$, and a distance $a_{2-3}$ separates display $100_2$ from display $100_3$. For one embodiment, the distances a include the bezels 104 of successively adjacent display segments 100 and a gap between these bezels, as shown in FIG. 2. For another embodiment, the gap may be eliminated; the bezels 104 may be eliminated; or both the gap and the bezels 104 may be eliminated. Each of display segments 100 may have the same height $d_h$ for some embodiments, as shown in FIG. 2.

Cameras $102_1$, $102_2$, and $102_3$ respectively have optical axes $110_1$, $110_2$, and $110_3$, as shown in FIG. 1. Optical axes $110_1$, $110_2$, and $110_3$ respectively bisect angles of view $a_1$, $a_2$, and $a_3$ respectively of cameras $102_1$, $102_2$, and $102_3$, as shown in FIG. 1. Cameras $102_1$, $102_2$, and $102_3$ can be moved (or panned) so as to respectively sweep out pan angles $\phi_1$, $\phi_2$, and $\phi_3$ in the plane of FIG. 1, as shown in FIG. 1. Cameras 102 can be moved (or tilted) so as to respectively sweep out tilt angles $\theta$ in the plane of FIG. 3, as shown in FIG. 3 for a tilt angle $\theta_2$ of camera $102_2$, where a zero tilt angle occurs when the optical axes are horizontal. Cameras 102 can be moved (or rolled) about there respective optical axes 110 as indicated by arrow 305 in FIG. 3. For other embodiments, cameras 102 may be located below display segments 100 and may be directed along a horizontal line 330 (FIG. 3), in which case the tilt angle $\theta$ is zero.

Cameras $102_1$, $102_2$, and $102_3$ respectively have regions of useful image quality (or depths of field) $300_1$, $300_2$, and $300_3$, as shown in FIG. 1. As shown for camera $102_2$, in FIG. 3, the region of useful image quality $300_2$ lies within the angle of view between a near bounding plane $302_2$ and a far bounding plane $304_2$ that are perpendicular to optical axis $110_2$, and are respectively at distances $f_{near,2}$ and $f_{far,2}$ from camera $102_2$. Note that near bounding plane $302_2$ corresponds to the bottom of the image field of camera $102_2$, and far bounding plane $304_2$ corresponds to the top of the image field of camera $102_2$. Each camera 102 has a focal distance f, e.g., focal distance $f_2$ for camera $102_2$ (FIG. 3), between the distances $f_{near}$ and $f_{far}$. A focal plane is located between the near and far planes that bound the region useful image quality at the focal distance f, e.g., as shown in FIG. 3 for a focal plane $175_2$ located at focal distance $f_2$ from camera $102_2$ between near bounding plane $302_2$ and far bounding plane $304_2$.

The room includes a table 150, as shown in FIG. 1, that for one embodiment may include table segments, $152_1$, $152_2$, and $152_3$ respectively corresponding to cameras $102_1$, $102_2$, and $102_3$. For another embodiment, each table segment 152 may be an individual table. For various embodiments, edges 154 at the back of the respective table segments 152, facing the back of the room, might not lie in the same plane, but are at angles to each other, as shown in FIG. 1. For one embodiment, table 150 may have a curved edge. Alternatively, for some embodiments, e.g., involving a straight table, the edges 154 of the respective table segments 152 are substantially collinear. For one embodiment, a wall 320, opposite display 101, may be located within region of useful image quality 300, as shown in FIG. 3.

Note that, a person sitting at the table behind the edge 154 is in the region of useful image quality 300, as is a portion of the table in front of the edge 154, as shown in FIG. 3. This enables objects placed on the table to be within the region of useful image quality 300. For another embodiment, wall 320 may coincide with the far bounding plane $304_2$ of the region of useful image quality 300. For some embodiments, e.g., embodiments involving a straight table edge at the back of the table, cameras 102 may have the same focal distance f. For other embodiments, the optical axes of cameras 102 may make the same tilt angle θ with the horizontal.

For one embodiment, the tilt angle θ may be selected so that the region of useful image quality 300 is positioned above the table, e.g., to prevent corners of the table and features of the table that are not parallel to a display, such as seams, inlay, grain or surface patterns, from being displayed. For embodiments where the tilt angle θ is zero, the vertical distance above the floor of the room at which the cameras are located is selected so that the region of useful image quality 300 is positioned above the table. Positioning the region of useful image quality above the table, acts to reduce errors in perspective that may occur when an observer's line of sight, that may be represented by the horizontal line 330 in FIG. 3, does not coincide with the optical axes of the cameras, as illustrated for the optical axis $110_2$ of camera $102_2$ in FIG. 3. For one embodiment, the region of useful image quality may be adjusted so that a displayed table image is limited to the bottom portion of the display and is about 15 percent of the height of the display.

For one embodiment, a chair, such as a chair 340 of FIG. 3, may be located behind each of table segments $152_1$, $152_2$, and $152_3$. For another embodiment, focal planes $175_1$, $175_2$, and $175_3$ (FIG. 1), respectively of cameras $102_1$, $102_2$, and $102_3$, respectively intersect these chairs and thus persons seated in these chairs. Note that for one embodiment, each chair and a person sitting therein are located on an optical axis 110. Focal planes $175_1$, $175_2$, and $175_3$ respectively have widths $c_{w,1}$, $c_{w,2}$, and $c_{w,3}$ respectively perpendicular to optical axes $110_1$, $110_2$, and $110_3$. For another embodiment, the widths $c_{w,1}$, $c_{w,2}$, and $c_{w,3}$ may be substantially equal to each other. For one embodiment, focal planes 175 have a heights $c_h$, such as $c_{h,2}$, as shown in FIG. 3 for focal plane $175_2$.

For other embodiments, focal planes 175 are at angles to each other, as shown in FIG. 1. For some embodiments, planes 175 are coplanar, e.g., for embodiments where the table edge is straight. For one embodiment, a distance $b_{1-2}$ separates plane $175_1$ from plane $175_2$, and a distance $b_{2-3}$ separates plane $175_2$ from plane $175_3$. Note that adjusting the pan angles φ of cameras 102 and their rolls acts to adjust the separation distances b. For some embodiments, focal planes 175 may coincide with edges 154 of table segments 152.

For various embodiments, rooms having the camera setups, the display setups, and the table and chair placements of the embodiments described above in conjunction with FIGS. 1-3 are located at sites remote from each other. For example, for one embodiment, a room at a first site may include displays 100, cameras 102, and a table 150, where people, such as participants in a videoconference, sitting at table 150 observe images received at displays 100 from a second site remote from the first site. The second site may include displays 100, cameras 102, and a table 150, where people, such as participants in a videoconference, sitting at table 150 observe images received at displays 100 from the first site. For one embodiment, the displays 100, e.g., displays $100_1$, $100_2$, and $100_3$, of the first site respectively receive images from the cameras 102, e.g., cameras $102_1$, $102_2$, and $102_3$, at the second site and vice versa. For another embodiment, the cameras 102 at one site are adjusted so that an image displayed by the displays 100 at the other site appears as a single continuous image. That is, sizes and distances are preserved across the displays 100.

For one embodiment, equating the magnifications of the respective cameras 102 preserves the image sizes. Magnification may be defined as the ratio of an object's size in the image field to the size (width or height) of that object in a display field (or the size of that object as displayed on a display segment 100). For example, in terms of FIG. 1, the magnifications of cameras 102 are $$M_{camera} = (c/d)_1 = (c/d)_2 = (c/d)_3 \quad (1)$$

where $M_{camera}$ is the magnification, c is a horizontal or vertical distance in, or of, an image field (or an focal plane 175), d is a horizontal or vertical distance in, or of, a display field (or a display segment 100), and subscripts 1, 2, 3 respectively correspond the subscripts of cameras $102_1$, $102_2$, and $102_3$ of FIG. 1.

For other embodiments, from FIG. 1, a global or room magnification may be defined as the ratio of an overall length in an overall image field to an overall length in an overall display field:

$$M_{global} = (c_{w,1} + b_{1-2} + c_{w,2} + b_{2-3} + c_{w,3})/(d_{w,1} + a_{1-2} + d_{w,2} + a_{2-3} + d_{w,3}) \quad (2)$$

For some embodiments, the separation distances a between successive display segments 100 in a display field at the first site may be different than the separation distances a between successive display segments 100 in a display field at the second site. This may require the separation distances b between successive focal planes 175 at the first site to be different than the separation distances b between successive focal planes 175 at the second site. For one embodiment, equating the magnifications at the first and second sites preserves the sizes and distances between the two sites. The magnification at the first and second sites may be defined as the ratio of lengths in image field to the lengths in the display field. Therefore, $$M_{first} = (b/a)_{first} = (c/d)_{first} = M_{second} = (b/a)_{second} = (c/d)_{second} \quad (3)$$

where M is the magnification, a a separation distance between successive display segments, b a separation distance between successive focal planes, c a horizontal or vertical distance in the image field, d a horizontal or vertical distance in the display field, the subscript first refers to the first site, and the subscript second refers to the second site. Note that equation 3 enables the separation distances b at the first and second sites to be determined from known values of a, c, and d at the first and second sites.

Figure 4:
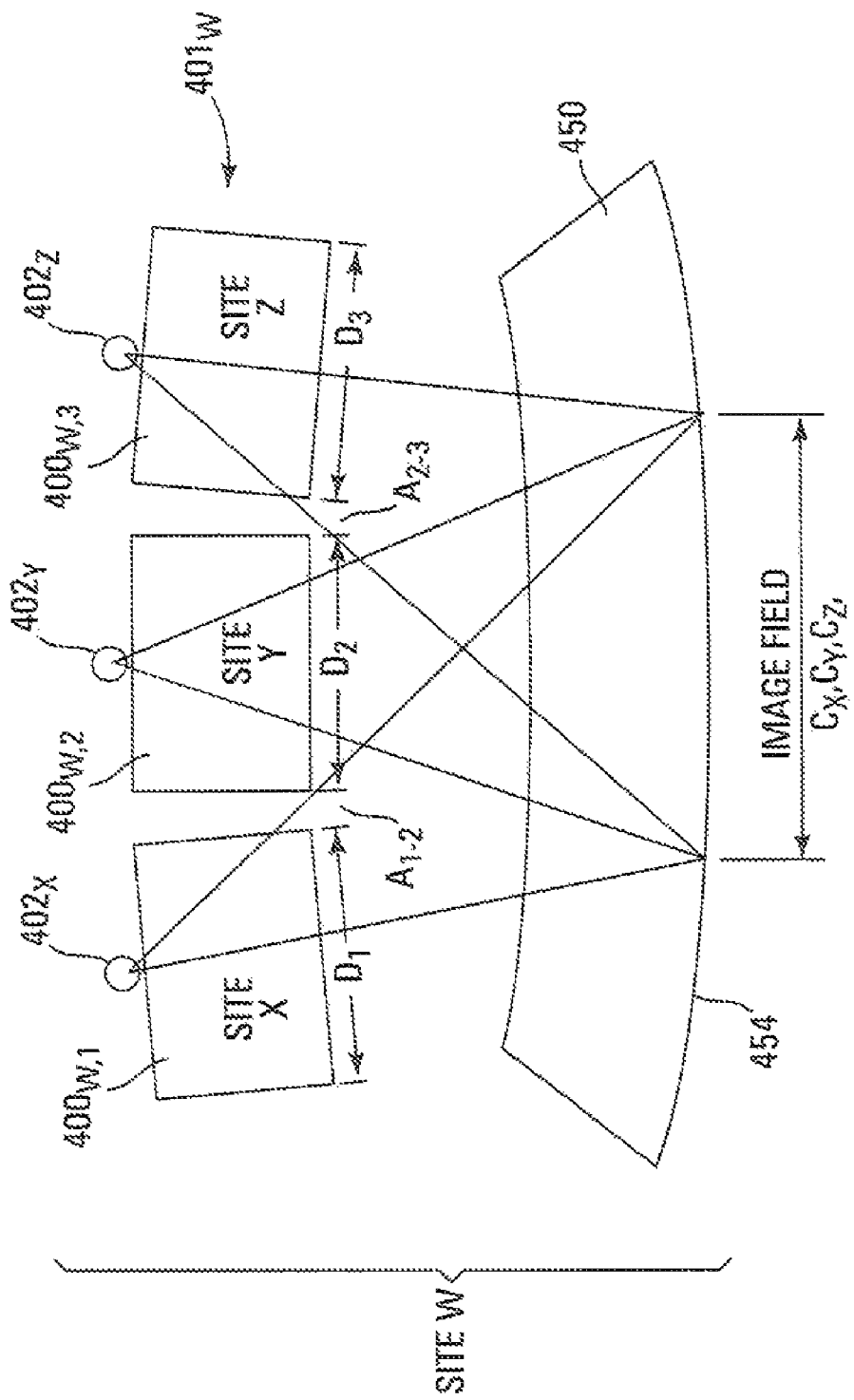
FIG. 4 illustrates an embodiment of a multipoint setup, according to another embodiment of the invention.

FIG. 4 illustrates a multipoint setup, according to another embodiment. Multipoint results from connecting more than two sites at one time. As shown in FIG. 4, a site W has a display $401_W$ having display segments $400_{W,1}$, $400_{W,2}$, and $400_{W,3}$ that respectively receive images from sites X, Y, and Z. Display segments $400_{W,1}$, $400_{W,2}$, and $400_{W,3}$ respectively have display (or display field) sizes $D_1$, $D_2$, and $D_3$. For one embodiment, display segment $400_{W,1}$ may be separated from display segment $400_{W,2}$ by a distance $A_{1-2}$, while display segment $400_{W,2}$ may be separated from display segment $400_{W,3}$ by a distance $A_{2-3}$. Sites X, Y, and Z respectively have cameras $402_X$, $402_Y$, and $402_Z$. Each of sites X, Y, and Z has a table 450 that may have a curved or straight edge 454 on a side opposite a camera 402. Cameras $402_X$, $402_Y$, and $402_Z$ respectively have image field sizes $C_X$, $C_Y$, and $C_Z$, e.g., at table edge 454 of their corresponding tables 450, as shown in FIG. 4, or at one or more chairs (not shown in FIG. 4) located behind table edge 454 of their corresponding tables 450. Cameras $402_X$, $402_Y$, and $402_Z$ respectively acquire one or more images and respectively transmit the one or more images to display segments $400_{W,1}$, $400_{W,2}$, and $400_{W,3}$ at site W.

The size of the images from sites X, Y, and Z should be preserved (or appear substantially continuous) across display segments $400_{W,1}$, $400_{W,2}$, and $400_{W,3}$ at site W. Selecting the magnification of the images displayed at display segments $400_{W,1}$, $400_{W,2}$, and $400_{W,3}$ to be the same accomplishes this. The magnification of an image displayed on each display segment 400 may be defined as the ratio of the size of the image field corresponding to that display to the size of the display field of that display. Therefore, for one embodiment, size preservation across display segments $400_{W,1}$, $400_{W,2}$, and $400_{W,3}$ is accomplished by $$M_{400} = C_X/D_1 = C_Y/D_2 = C_Z/D_3 \qquad (4)$$

where $M_{400}$ is the magnification of an image displayed on each display segment 400.

An optional criterion, for other embodiments, is shape preservation across display segments $400_{W,1}$, $400_{W,2}$, and $400_{W,3}$ at site W. For example, edge 454 of the table 450 at each of sites X, Y, and Z, should appear continuous across display segments $400_{W,1}$, $400_{W,2}$, and $400_{W,3}$. Size and shape continuity is illustrated for the display segments 100 of FIGS. 1-3 in FIG. 2.

Figure 5:
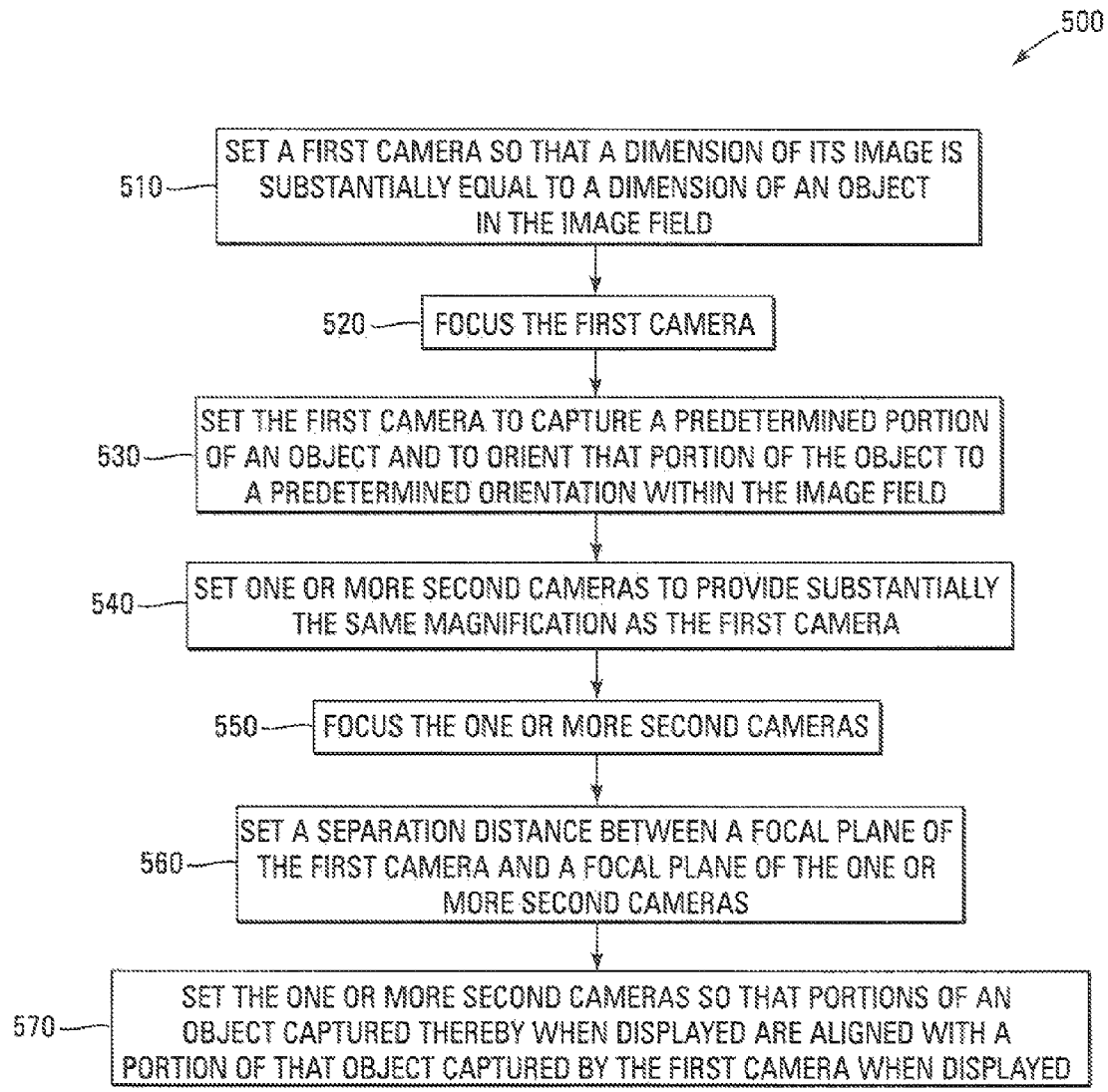
FIG. 5 is a flowchart of an embodiment of a method, according to another embodiment of the invention.

FIG. 5 is a flowchart of a method 500, according to another embodiment, of adjusting two or more cameras, e.g., cameras 102 of FIG. 1, respectively corresponding to at least two displays, e.g., displays 100 of FIG. 1. For one embodiment, displays 100 are located at a first site and cameras 102 at a second site remote from the first site. A table, such as table 150 of FIG. 1, may also be located at the second site. In method 500, cameras 102 are adjusted so that an image displayed by the displays 100 appears as a substantially continuous image, where sizes and distances are preserved across the displays 100. For another embodiment, method 500 may be used to adjust cameras of a multipoint setup, e.g., as shown in FIG. 4, where the cameras, such as cameras $402_X$, $402_Y$, and $402_Z$, are respectively located at different sites and respectively transmit images to display segments, such as display segments $400_{W,1}$, $400_{W,2}$, and $400_{W,3}$, located at another site.

At block 510, a first camera, such as camera $102_2$, is set so that a dimension of its image field is substantially equal to a dimension of an object in the image field. For example, for one embodiment, this involves zooming camera $102_2$ so that a width of its image field is equal to a width of a table segment at the edge, as shown in FIG. 1. For one embodiment, widths of the table segments are marked by placing markers 185, such as veneer strips or the like, on the table, as shown in FIG. 1. For example, the width of table segment $152_2$ at edge 154 may correspond to the distance between markers $185_{2,1}$ and $185_{2,2}$ (FIG. 1). Note that prior to zooming, camera $102_2$ may be panned so its optical axis $110_2$ substantially bisects the width of table segment $152_2$ at edge 154 of the table or the distance between markers $185_{2,1}$ and $185_{2,2}$, as shown in FIG. 1.

Alternatively, camera $102_2$ may be zoomed so that a height of its image field is substantially equal to the height of an object placed on table segment $152_2$ at edge 154. For some embodiments, cameras 102 have a fixed aspect (height-to-width) ratio, so that adjusting one dimension of the focal plane establishes the other dimension of the focal plane. For other embodiments, the height and width of the focal plane may be adjusted independently.

At block 520, the first camera, e.g., camera $102_2$, is focused. This involves bringing an object into focus and thereby establishes the location of focal plane $175_2$. For example, to locate focal plane $175_2$ behind edge 154 of table segment $152_2$ (FIG. 1) at chair 340 (FIG. 3), an object located at chair 340 is brought into focus. For embodiments where focal plane $175_2$ coincides with edge 154 of table segment $152_2$, an object placed on table segment $152_2$ at edge 154 is brought into focus during focusing. Alternatively, edge 154 of table segment $152_2$ may be brought into focus for another embodiment. For one embodiment, block 510 may involve adjusting camera $102_2$ so that the width $c_{w,2}$ of its focal plane $175_2$ is substantially equal to the width of table segment $152_2$ at edge 154 or the distance between markers $185_{2,1}$ and $185_{2,2}$ at edge 154. For this embodiment, focusing camera $102_2$ may occur substantially concurrently with adjusting the width of focal plane $175_2$ and may involve an iterative process.

For one embodiment, an object is in focus when a contrast of the image field is at or exceeds a predetermined contrast. Contrast may be defined as a difference between the lightest and darkest areas of an image field. Contrast ratio is another way of describing the contrast and may be defined as the ratio of the maximum value of the dynamic range of an image to the minimum value of the dynamic range of the image. The contrast (or contrast ratio) may be determined from the darkest and lightest pixels of an image field for digital images. Alternatively, light pixels may be averaged and dark pixels may be averaged, and the contrast may be determined from these averages.

Figure 6:
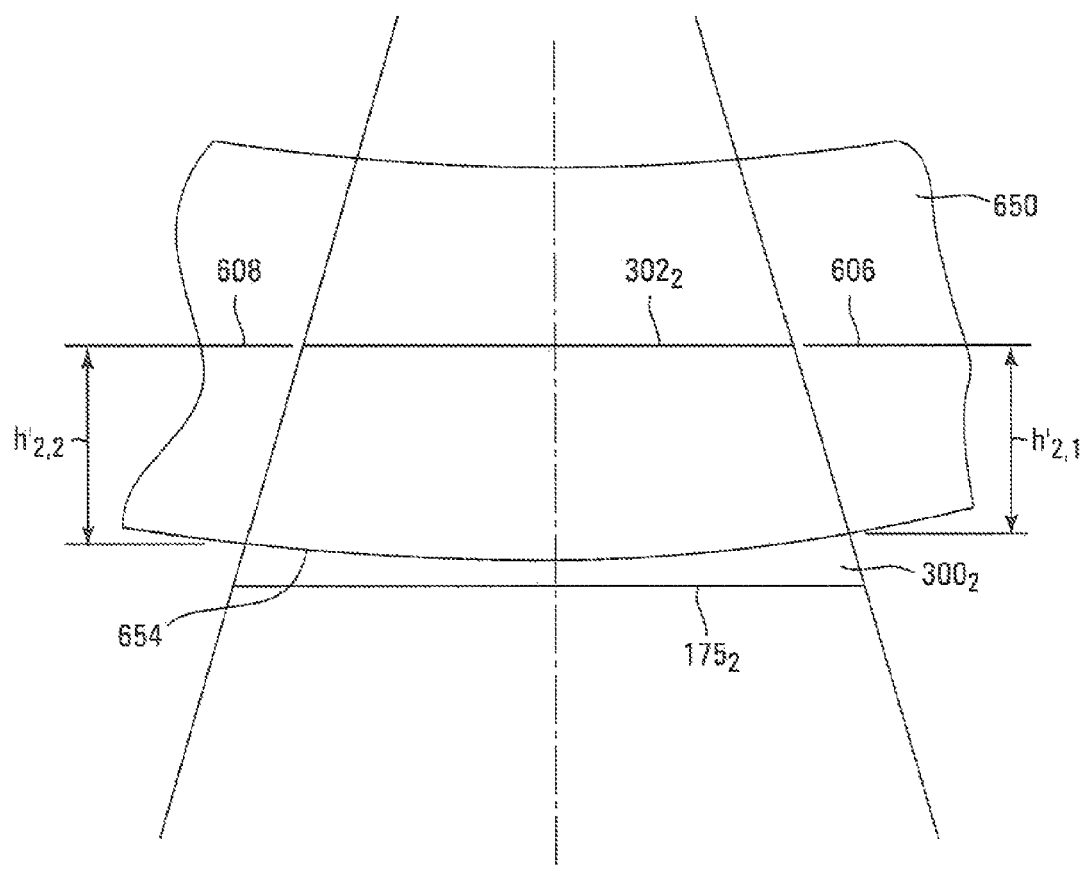
FIG. 6 is a top view illustrating an embodiment of a marked-up table segment, according to another embodiment of the invention.

At block 530, camera $102_2$ is set to capture a predetermined portion of an object, e.g., table segment $152_2$ or an object placed on table segment $152_2$ or on chair 340 (FIG. 3), and to orient, e.g., level, that portion of the object to a predetermined orientation within the image field. For example, for a table 650 shown in FIG. 6 (a top view), tilting or tilting and rolling camera $102_2$ so that the near boundary plane $302_2$ of the region of useful image quality $300_2$ is at markers 606 and 608 disposed on an upper surface of table 650 accomplishes this for one embodiment. Note that the distance $h'_{2,1}$ between table edge 654 and marker 606 and the distance $h'_{2,2}$ between table edge 654 and marker 608 respectively correspond to vertical distances of table edge 654 above a bottom of a display.

Figure 7:
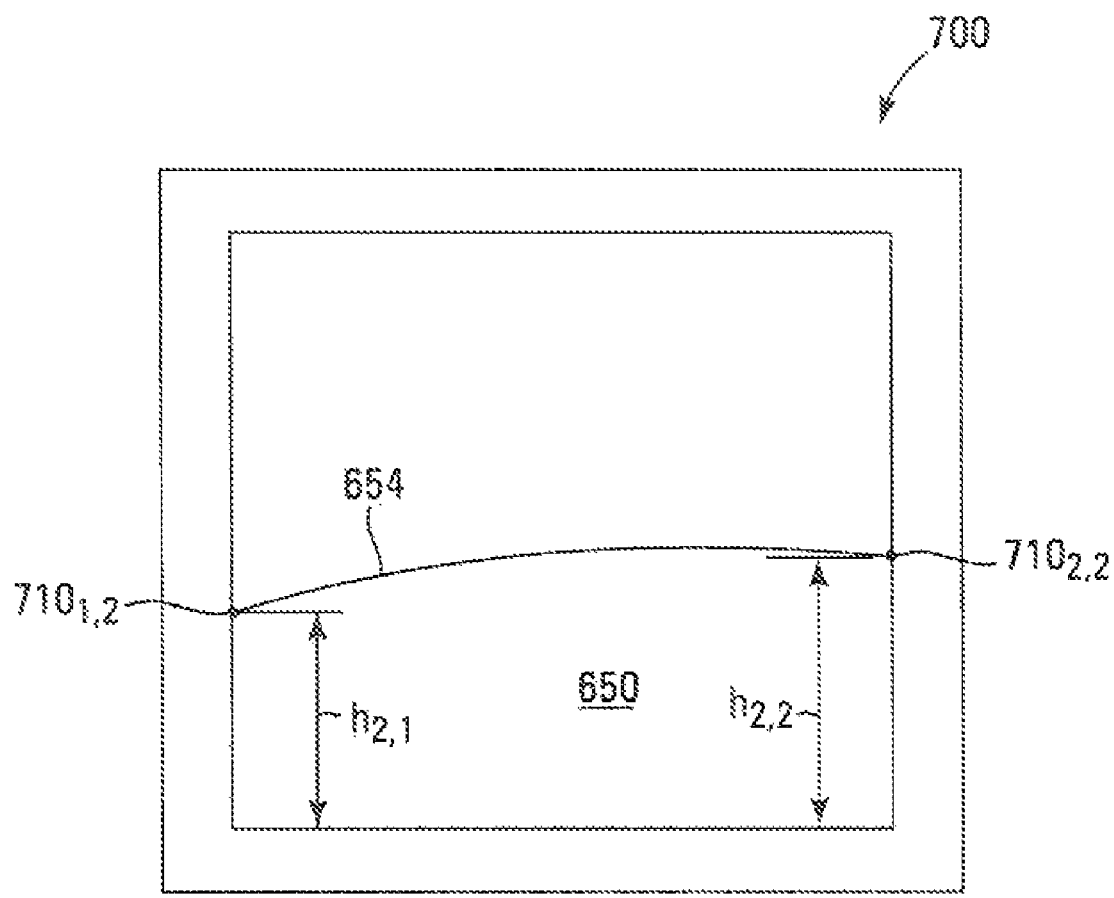
FIG. 7 illustrates an embodiment of a displayed image, according to another embodiment of the invention.

Alternatively, the portion of the object that is visible in the image is determined by displaying the object on display segment $100_2$ or on a monitor screen, such as monitor display screen 700 in FIG. 7, while tilting or rolling and tilting camera $102_2$ so that intersections $710_{2,1}$ and $710_{2,2}$ of the image of table edge 654 and the vertical boundaries of monitor screen 700 are respectively at vertical distances $h_{2,1}$, and $h_{2,2}$ above the bottom of monitor screen 700. Note that distances $h_{2,1}$ and $h_{2,2}$ respectively correspond to distances $h'_{2,1}$ and $h'_{2,2}$ of FIG. 6. For another embodiment, the image of table edge 654 lies within a vertical distance from the bottom of monitor display screen 700 that is about 15 percent of the height of monitor display screen 700.

Note that blocks 510, 520, and 530, may be performed in various orders other than the order shown in the flowchart. Moreover, one or more of blocks 510, 520, and 530, may be repeated. For one embodiment, the pan, tilt, roll, and zoom settings of camera $102_2$ may be stored after completing blocks 510, 520, and 530.

At block 540 one or more second cameras, e.g., cameras $102_1$ and camera $102_3$, are set to provide substantially the same magnification as camera $102_2$. For one embodiment, a standard object is placed so that a portion thereof extends into the image field of camera $102_2$ and another portion extends into either the image field of camera $102_1$ or of camera $102_3$, as shown in FIG. 1. For example, for one embodiment, the object, e.g., object 190 of FIG. 1, may be placed at edge 154 of table 150 so that a portion extends onto table segment $152_2$ corresponding to camera $102_2$ and a portion extends onto either table segment $152_1$ corresponding to camera $102_1$ or onto table segment $152_3$ corresponding to camera $102_3$. Then, either camera $102_1$ or $102_3$ is zoomed so that the image of the portion of object 190 captured by camera $102_1$ or $102_3$ that is displayed in the respective one of displays $100_1$ or $100_3$ used for monitoring or a monitor screen is substantially the same size as the image of the portion of object 190 captured by camera $102_2$ that is displayed in display $100_2$ or on a monitor screen.

Alternatively, for some embodiments, the distance between markers $185_{2,1}$ and $185_{2,2}$ corresponding to camera $102_2$ and the distance between markers $185_{1,1}$ and $185_{1,2}$, corresponding to camera $102_1$ are substantially equal, and the process described above in conjunction with block 510 is used to set a width of the image field of camera $102_1$ to be substantially equal to the distance between markers $185_{1,1}$ and $185_{1,2}$. Note that this sets the magnifications of cameras $102_1$ and $102_2$ substantially equal. Note that substantially the same procedure can be used to set the magnification of camera $102_3$ substantially equal to that of camera $102_2$.

Cameras $102_1$ and $102_3$ are focused at block 550, e.g., according to the embodiments described above in conjunction with block 520. That is, an object placed on table segment $152_1$ for camera $102_1$ (table segment $152_3$ for camera $102_3$), such as at edge 154, or behind table edge 154 is brought into focus. For one embodiment, the table edge 154 of table segment $152_1$ for camera $102_1$ (table segment $152_3$ for camera $102_3$) is brought into focus at block 550, meaning that focal plane $175_1$ (or focal plane $175_3$) is located at edge 154. For this embodiment, setting the magnification at block 540 and focusing at block 550 are performed substantially concurrently. For embodiments where the back edge of a table is straight and lies in substantially one plane, such as edge 654 of table 650 of FIG. 6, cameras 102 may have the same or substantially the same focal distance f when focused.

For one embodiment, each of the cameras, i.e., the first camera and each of the one or more second cameras, may be focused before setting their magnifications. For another embodiment, setting the magnification of each camera and focusing that camera may be performed iteratively because focusing may change the magnification and vice versa. For example, the magnification may be set, followed by focusing, followed by checking the magnification, followed by resetting the magnification if the magnification changed, followed by checking the focus, followed by refocusing if the focus changed, followed by checking the magnification, and so on until the desired magnification and focus are achieved for each camera.

At block 560, a separation distance between the focal planes of the cameras is set. For example, distance $b_{1-2}$ (FIG. 1) separating successively adjacent planes $175_1$ and $175_2$ and distance $b_{2-3}$ separating successively adjacent planes $175_2$ and $175_3$ are set. For one embodiment, panning or panning and rolling camera $102_1$ (or camera $102_3$) accomplishes this. Specifically, for one embodiment, markers, such as markers 185 (FIG. 1), or objects disposed on the tabletop may be used to set the separation distance b. For example, with camera $102_2$ set up as described above in conjunction with blocks 510, 520, and 530, an edge of its image field may be at an edge of marker $185_{2,1}$, as shown in FIG. 1, or an edge of focal plane $175_2$ may be at an edge of marker $185_{2,1}$ (not shown) for embodiments where focal plane $175_2$ is at edge 154. To set distance $b_{1-2}$, camera $102_1$ is panned or panned and rolled so that an edge of its image field is at an edge of marker $185_{1,2}$, as shown in FIG. 1, or an edge of focal plane $175_1$ is at an edge of marker $185_{1,2}$ (not shown) for embodiments where focal plane $175_1$ is at edge 154. A similar procedure may be used to set distance $b_{2-3}$.

At block 570, cameras $102_1$ and $102_3$ are set so that portions of an object, such as a tabletop, captured thereby when displayed are aligned with a portion of that object captured by the first camera when displayed. This enables continuous lines, e.g., an edge of a table, portions of a person's anatomy, etc., segments of which are respectively captured by cameras 102 and displayed on display segments 100, to appear substantially continuous across display segments 100, as illustrated in FIG. 2. For one embodiment, this involves displaying different segments of the tabletop respectively captured by cameras 102, e.g., on a continuous monitor screen or on segments of a segmented monitor screen, and adjusting cameras $102_1$ and $102_3$ so that the displayed tabletop segments corresponding thereto align (or conform) with the displayed tabletop segment corresponding to camera $102_2$. Note that the displayed tabletop segment corresponding to camera $102_2$ is positioned as described above in conjunction with block 530 and FIGS. 6 and 7.

Figure 8:
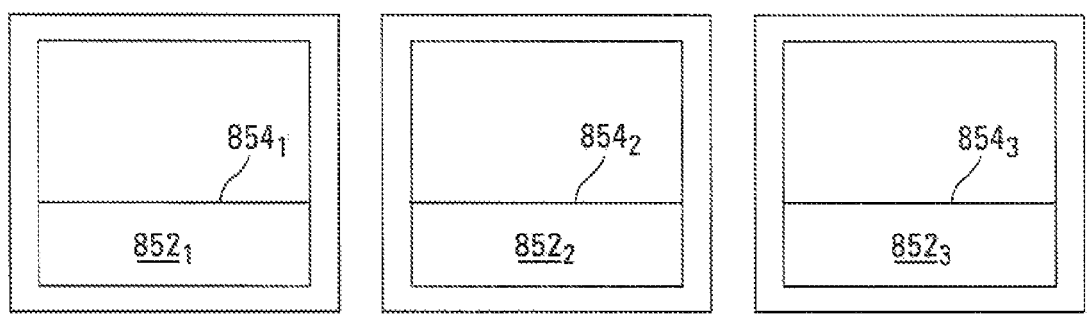
FIG. 8 illustrates yet another embodiment of a displayed image, according to yet another embodiment of the invention.

FIG. 8 illustrates the display of tabletop segments $852_1$, $852_2$, and $852_3$, according to another embodiment, respectively captured by cameras $102_1$, $102_2$, and $102_3$ on a monitor screen or on a display, such as display 101 of FIG. 1, used for monitoring. The edge of the tabletop is straight so that edge thereof lies in a substantially single plane. Therefore, cameras $102_1$ and $102_3$ are tilted or tilted and rolled so that displayed edge segments $854_1$ and $854_3$, respectively of tabletop segments $852_1$ and $852_3$, are substantially collinear with displayed edge segment $854_2$ of tabletop segment $852_1$. That is, cameras $102_1$ and $102_3$ are tilted or tilted and rolled so that displayed edge segments $854_1$ and $854_3$ are located at substantially the same distance above the bottom of the monitor screen as displayed edge segment $854_2$. Note that the distance above the bottom of the monitor screen of displayed edge segment $854_2$ was set at block 530.

Figure 9:
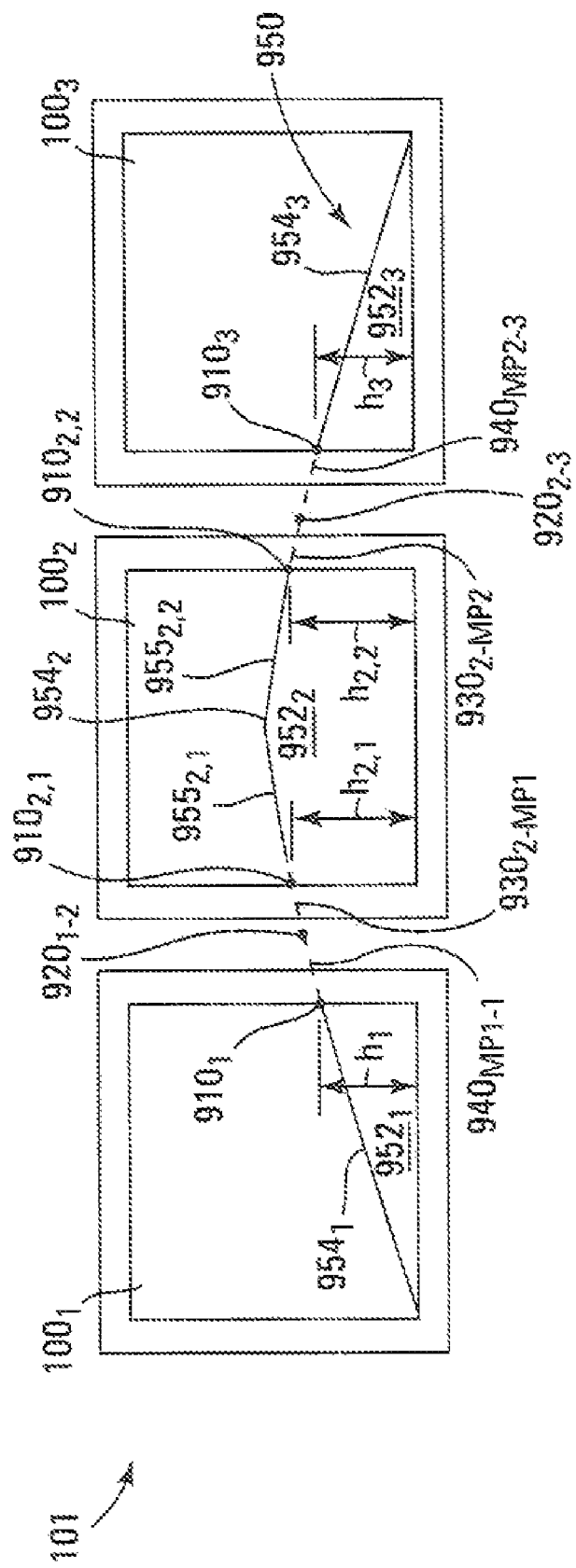
FIG. 9 illustrates still another embodiment of a displayed image, according to yet another embodiment of the invention.

FIG. 9 illustrates tabletop segments $952_1$, $952_2$, and $952_3$ of a table 950, respectively captured by cameras $102_1$, $102_2$, and $102_3$, displayed on a monitor screen or on a display, such as display 101 of FIG. 1 as shown in FIG. 9, used for monitoring, according to another embodiment. Tabletop segment $952_2$ has an edge segment $954_2$ that includes portions $955_{2,1}$ and $955_{2,2}$ that are angled with respect to each other. Tabletop segments $952_1$ and $952_3$ respectively have straight edge segments $954_1$ and $954_3$ that respectively form angles with portions $955_{2,1}$ and $955_{2,2}$ of edge segment $954_2$. Note that the shape of the edge of table 950 is similar to the shape of edge 154 of table 150 of FIG. 1.

The respective vertical distances $h_{2,1}$ and $h_{2,2}$ of ends $910_{2,1}$ and $910_{2,2}$ of edge segment $954_2$ above the bottom of display segment $100_2$ are established by adjusting camera $102_2$ as described above in conjunction with block 530. Camera $102_1$ (or camera $102_3$) camera is rolled and tilted so that an end $910_1$ of edge segment $954_1$ is at the vertical distance $h_1$ above the bottom of display segment $100_1$ (or an end $910_3$ of edge segment $954_3$ is at the vertical distance $h_3$ above the bottom of display segment $100_3$).

The vertical distances $h_1$ and $h_3$ are determined from vertical distances $h_{2,1}$ and $h_{2,2}$, as follows: For one embodiment, portion $955_{2,1}$ (or portion $955_{2,2}$) of edge segment $954_2$ is extended beyond end $910_{2,1}$ (or end $910_{2,2}$), e.g., to midway between display segments $100_1$ and $100_2$ (or display segments $100_1$ and $100_3$), as indicated by a dashed line $930_{2-MP1}$ (or a dashed line $930_{2-MP2}$) in FIG. 9. This establishes a point $920_{1-2}$ (or a point $920_{2-3}$), e.g., midway between display segments $100_1$ and $100_2$ (or between display segments $100_1$ and $100_3$). The vertical distance $h_1$ (or $h_3$) occurs, for example, at the intersection of the vertical edge of display segment $100_1$ corresponding to end $910_1$ of edge segment $954_1$ (or display segment $100_3$ corresponding to end $910_3$ of edge segment $954_3$) and a dashed line $940_{MP1-1}$ (or dashed line $940_{MP2-3}$) extending from point $920_{1-2}$ (or point $920_{1-2}$) at the same slope as edge segment $954_1$ (or edge segment $954_3$), as shown in FIG. 9.

For another embodiment, curve fits may be used to determine the vertical distances of ends $210_1$ and $210_3$, respectively of edge segments $254_1$ and $254_3$ of table $250$ of FIG. 2, respectively from the bottoms of displays $100_1$ and $100_3$. This is indicated by dashed line $230_1$ between the ends $210_1$ and $210_{2,1}$ respectively of edge segments $254_1$ and $254_2$ and by dashed line $230_3$ between the ends $210_{2,2}$ and $210_3$ respectively of edge segments $254_2$ and $254_3$.

Note that blocks 540, 550, 560, and 570, may be performed in various orders other than the order shown in the flowchart. Moreover, one or more of blocks 540, 550, 560, and 570, may be repeated. For one embodiment, the pan, tilt, roll, and zoom settings of cameras $102_1$ and $102_3$ may be stored after completing blocks 540, 550, 560, and 570.

CONCLUSION

Although specific embodiments have been illustrated and described herein it is manifestly intended that the scope of the claimed subject matter be limited only by the following claims and equivalents thereof.

What is claimed is:

1. A method of adjusting two or more cameras, comprising:
    setting a magnification of a first and a second camera at a first videoconferencing endpoint by setting a ratio of a distance in an image field of the first camera to a distance in a display field of a first display at a second videoconferencing endpoint to be substantially equal to a ratio of a distance in an image field of the second camera to a distance in a display field of a second display at the second videoconferencing endpoint, wherein the second videoconferencing endpoint is different from the first videoconferencing endpoint; and
    setting the first and second cameras so that a portion of an object, at the first videoconferencing endpoint, captured in an image by the first camera is aligned with a portion of an object, at the second videoconferencing endpoint, captured in an image by the second camera.

2. The method of claim 1 wherein setting the magnification of the first camera further comprises setting the first and second cameras so that a ratio of a length of the object in an image field of the first camera, at the first videoconferencing endpoint, to a length of the object in the display field of the first display, at the second videoconferencing endpoint, that receives images from the first camera is substantially equal to a ratio of a length of the object in an image field of the second camera, at the first videoconferencing endpoint, to a length of the object in the display field of the second display, at the second videoconferencing endpoint, that receives images from the second camera.

3. The method of claim 1, further comprising setting the contrast of the respective image fields of the two or more cameras to a level that is at or exceeds a predetermined level.

4. The method of claim 1, wherein setting the magnification of the first camera comprises setting the first and second cameras so that widths of their respective image fields are respectively substantially equal to widths of second and third objects, respectively at the first and second videoconferencing endpoints.

5. The method of claim 1, further comprising setting focal distances of the first and second cameras to be substantially equal.

6. The method of claim 1 further comprising setting the first and second cameras to have substantially equal tilt angles with respect to the horizontal.

7. A method of adjusting cameras, comprising:
    setting a first camera, at a first videoconferencing endpoint, to capture a desired portion of a first object and to orient that portion of the first object to a desired orientation within an image field of the first camera;
    setting a magnification of a second camera, at the first videoconferencing endpoint by setting a ratio of a distance in an image field of the second camera to a corresponding distance in a display field of a second display at a second videoconferencing endpoint to be substantially equal to a ratio of a distance in the image field of the first camera to a corresponding distance in a display field of a first display at the second videoconferencing endpoint; and
    setting the second camera to capture a desired portion of a second object and to orient that portion of the second object within the image field of the second camera such that the desired portions of the respective first and second objects are substantially aligned with each other when the desired portion of the first object is displayed on the first display and the desired portion of the second object is displayed on the second display.

8. The method of claim 7 further comprising setting the first camera an that a dimension of its image field is substantially equal to a dimension of the first object.

9. The method of claim 8 wherein setting the first camera so that a dimension of its image field is substantially equal to the dimension of the first object comprises setting a width of the image field to be substantially equal to a distance between two markers disposed on a table.

10. The method of claim 7, wherein setting the first camera to capture a predetermined portion of the first object comprises positioning a near boundary plane of a region of useful focus of the first camera at a marker disposed on a table.

11. The method of claim 7, further comprising focusing the first camera.

12. The method of claim 11, wherein focusing the first camera comprises bringing a third object located behind an edge of a table into focus.

13. A method of adjusting cameras, comprising:
    setting a first camera, at a first videoconferencing endpoint, to capture a predetermined portion of a first object, to orient that portion of the first object to a predetermined orientation within an image field of the first camera, and to position a near boundary plane of a region of useful focus of the first camera at a predetermined position;
    setting a second camera, at a first videoconferencing endpoint by setting a ratio of a distance in an image field of the second camera to a distance in a display field of a second display at a second videoconferencing endpoint to be substantially equal to a ratio of a distance in an image field of the first camera to a distance in a display field of a first camera at the second videoconferencing endpoint, wherein the second videoconferencing endpoint is different from the first videoconferencing endpoint; and
    setting the second camera so that a portion of a second object captured by the second camera and the portion of the first object captured by the first camera are aligned when images captured by the first and second cameras are displayed concurrently at the second videoconferencing endpoint.

14. The method of claim 13 wherein setting the second camera includes setting a ratio of a length of the portion of the second object within the image field of the second camera to a length of the displayed portion of the second object equal to a ratio of a length of the portion of the first object within the image field of the first camera to a length of the displayed portion of the second object.

15. The method of claim 13 wherein:
   setting the first camera, at the first videoconferencing endpoint, to capture a predetermined portion of a first object and to orient that portion of the first object to a predetermined orientation within the image field of the first camera includes setting the first camera to capture a predetermined portion of a first table located at the first videoconferencing endpoint and to orient that portion of the first table to a predetermined orientation within the image field of the first camera; and
   setting the second camera so that a portion of a second object captured by the second camera and the portion of the first object captured by the first camera are aligned when images captured by the first and second cameras are displayed concurrently at the second videoconferencing endpoint includes setting the second camera so that a portion of a second table that is different from the first table captured by the second camera and the portion of the first table are aligned when images captured by the first and second cameras are displayed concurrently at the second videoconferencing endpoint.

16. The method of claim 1, wherein the object at the first videoconferencing endpoint is a table and the object at the second videoconferencing endpoint is a table.

17. The method of claim 1, wherein setting the magnification further comprises setting a ratio of a distance between successive display segments to a separation distance between successive focal planes at the first videoconferencing endpoint to be substantially equal to a ratio of a distance between successive display segments to a separation distance between successive focal planes at the second videoconferencing endpoint.

* * * * *

UNITED STATES PATENT AND TRADEMARK OFFICE
CERTIFICATE OF CORRECTION

PATENT NO. : 8,103,157 B2  
APPLICATION NO. : 12/837966  
DATED : January 24, 2012  
INVENTOR(S) : Mark E Gorzynski et al.

Page 1 of 1

It is certified that error appears in the above-identified patent and that said Letters Patent is hereby corrected as shown below:

In column 10, line 33, in Claim 8, delete "an" and insert -- so --, therefor.

Signed and Sealed this  
Fourth Day of December, 2012

David J. Kappos  
*Director of the United States Patent and Trademark Office*